Patented Apr. 19, 1927.

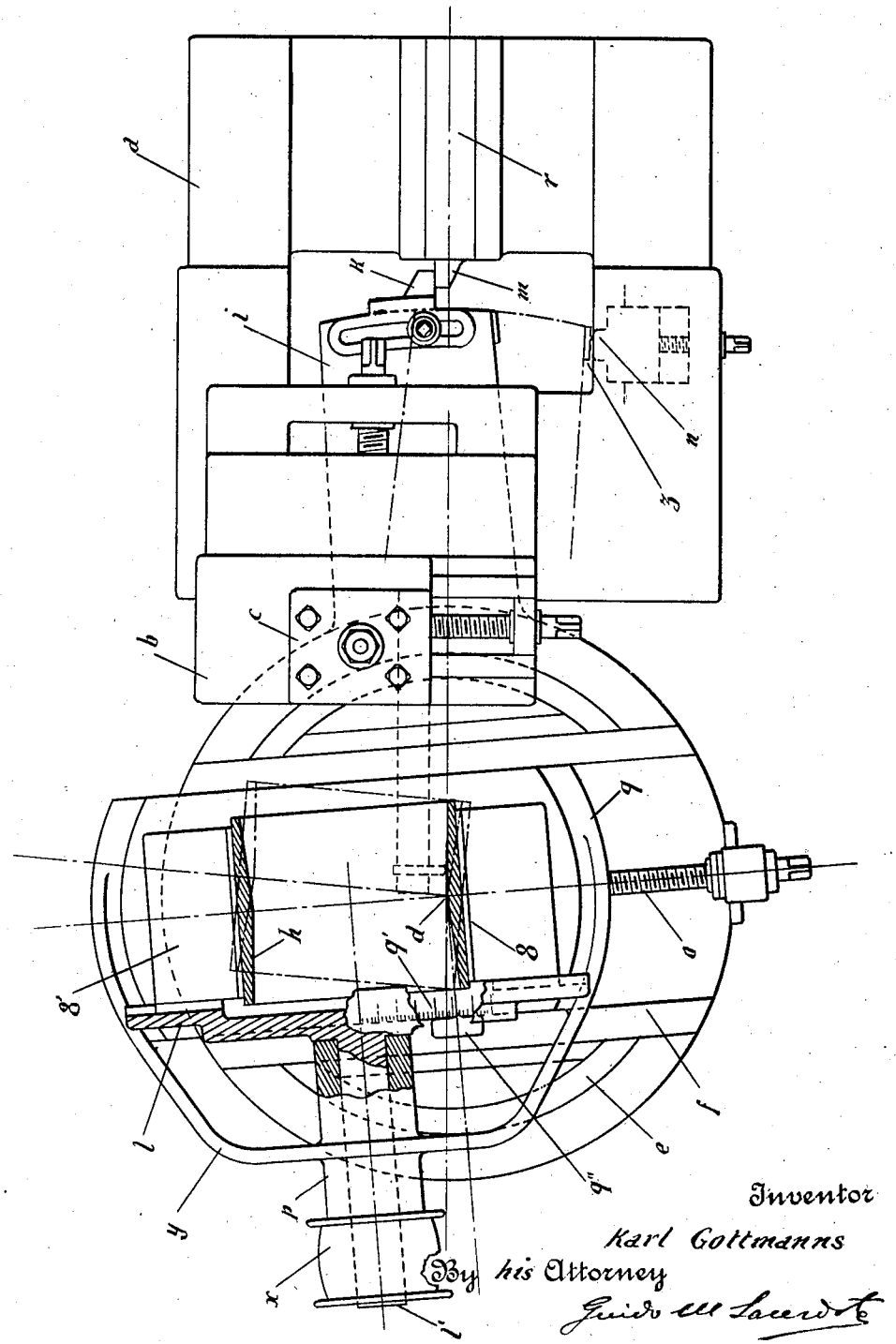

1,625,650

UNITED STATES PATENT OFFICE.

KARL GOTTMANNS, OF HILDEN, GERMANY.

METHOD OF MACHINING DOUBLE CONICAL WORK PIECES.

Application filed November 14, 1925, Serial No. 69,136, and in Germany October 30, 1924.

My invention relates to a method of cutting threads into double-conical work pieces on lathes in a continuous procedure and without re-chucking. It has already been proposed to produce double-conical interior surfaces in hollow bodies, for instance tube sockets, on lathes in a con'inuous procedure and without re-chucking by causing a tool having two cutting edges to pass through the respective work piece, this latter being caused to ro'ate at an angle with respect to the direction of movement of the respective tool. The manufacture of hollow bodies with double-conical interior thread on a lathe by milling operations, the work piece being arranged at an angle relatively to the axis of the milling tool, and the tool slide being re-adjusted for the second cone when the first has been worked, is also known.

Now, the present invention is distinguished from said known methods and procedures on principle by the fea'ure that when one of the cones of the double-conical work piece has been provided with the thread, the work piece is turned automatically in such a way that the generatrix of the other cone coincides with the direction of movement of the tool. It is by this procedure rendered possible to obtain a continuous thread of greatest accuracy, as is often necessary in precision work. The section of the finished thread is perfectly equal in both bores, and faults caused by different designs or configurations of two tools or by differently strong wear and tear, as well as by different setting of the tool when passing over from one cone to the other, cannot occur. The thread may be cut roughly or finely and the detachment of the cuttings may be regulated quite at will without any change in the conicity as adjusted once for all. In any case the thread consists of a continuous helix like that on a threaded socket.

My invention is illustrated diagrammatically and by way of example on the accompanying drawing in which the new arrangement and combination of parts is shown in plan. On the drawing, $a$ denotes the lathe bed and $b$ the tool carrier which may be provided with a revolving turret, if desired, and is shiftable in a straight line. If a revolving turret is provided, it may be adjustable in known manner transversely with respect to the longitudinal movement of the tool slide. $e$ designates a circular plate which is mounted on the lathe bed so as to be rotatable on a vertical axis. Said plate carries a chuck adapted to receive the work piece $h$, said chuck being adjustable transversely of plate $e$ and being rotatably mounted so as to cause rotatory motion of the work in relation to the tool. A suitable arrangement to this end may be obtained in a number of ways and for the purpose of illustration, in the drawing I show an arrangement which is both simple and practical, whereby my invention may be carried into practice.

In the same it will be observed that the chuck proper consists of a plurality of jaws $g$; $g'$, radially adjustable on a disc plate $l$ which is integral with or mounted on a shaft $l'$, rotatably mounted in a bearing $p$, carried by a slide plate $q$, said slide plate $q$, running within runways $f$ provided in plate $e$ and being adjustable transversely of plate $e$ by means of an adjusting screw $o$. Slide plate $q$ is provided with a scale $q'$ which may be used in connection with a stationary indicator $q''$ to effect an exact adjustment of the work held in chuck. From this arrangement it follows that bearing $p$ and the chuck supported thereby will participate in the angular movements of plate $e$ around its vertical axis, so that the means for driving shaft $l'$ must be such as to permit the rotation of said shaft in various angular alignments and transversal displacements in relation to the central line of the lathe bed.

A simple way of driving shaft $l'$ may be had by providing the same with a pulley $x$, which may be driven by a substantially vertical belt, such a belt allowing a fairly wide displacement of a pulley in a horizontal plane without the driving connection being disturbed in the least.

In case of exceptionally wide horizontal displacements of pulley $x$, any slack in the belt may be taken up by some suitable arrangement such as a spring actuated roller or other tensioning means.

On the rotatable plate $e$ is mounted a rigid arm $i$ which extends through below the bridge shaped tool slide and moves with the plate $e$. The arm $i$ carries the stop $k$ which is adjustable transversely of arm $i$ and which lies within the range of the releasable abutment $m$, provided on the lathe bed. This abutment is integral with a slide $r$, which is capable of longitudinal movement in relation to the lathe bed. Normally abutment m, projects inwardly in the path of stop k, and stop k is adjusted to the position where when it abuts against abutment m, plate e is set at the proper angle for the machining of one of the conical surfaces as shown.

From this position plate e, may be angularly displaced to its other extreme position if slide r, is moved outwardly thus releasing stop k. The angular travel of plate e, may now be regulated by adjusting the position of another stop m, provided on the lathe bed, transversely of the axis of said bed. Arm i, carries another abutment member z, which will come to abut against stop n when plate e is moved to its other extreme position as shown in dot-and-dash lines in the drawing.

After the work piece h has been clamped into the chuck g the slide g carrying the tool is so adjusted by means of the screw-threaded spindle o that the point d at which the generatrix of one of the conical surfaces intersects the generatrix of the other conical surface coincides with the axis of rotation of the plate e. If now the feed means are thrown into gear, thread is cut into that conical surface which lies in the first half of the work piece.

When the tool has arrived at the point d, abutment member n may be moved outwardly releasing stop k, and plate e can then be angularly dispaced to its other extreme position when abutment member z, contacts with stop n. The work piece will then be in the position shown in dot-and-dash lines ready for the machining of its other conical surface.

It is obvious that in practice, slide r, may be operatively connected with the tool carrier so as to be operated thereby at the proper time; this can be accomplished in a number of ways which are in the province of any skilled mechanic to devise.

Similarly, it is also obvious that once stop k has been released, the angular movement of plate e, may take place automatically through the employment of any suitable means; so that the entire work can be completed in one operation, the work piece being angularly displaced automatically as the tool arrives at point d.

The means for automatically causing the angular displacement of plate e, are not shown, because any number of devices may be employed for this purpose requiring only ordinary mechanical skill to devise.

It will be understood that the device in general and more especially, the chuck may be so modified that work pieces which are double-conical at their outer surface may be machined in a similar manner.

It will be observed that abutment k is first adjusted so that when the same rests against abutment m the side of the cone against which the tool is applied is parallel with the line of feed of the tool, which is in this case also parallel to the central line of the lathe bed; and when arm i is angularly displaced, after being released by abutment m, the side of the other cone in continuation of the former side will assume said parallel position. This, of course, is always done when machining conical work where the axis of the rotation of the work is so arranged that its side against which the tool is applied is parallel with the line of the longitudinal feed of said tool, but the chief distinguishing feature in the present method, which is both novel and important, is that the point at which the generatrix of the two opposing cones in direct alignment with the working edge of the tool meet, designated as point d, coincides with the vertical axis of plate e, that is, point d represents the fulcrum about which the angular movement of the double conical work-piece takes place as the working edge of the tool reaches said point. It follows that when this angular displacement of the work in relation to the tool takes place no movement of the point actually in contact with the tool at that time, occurs, so that the thread cut in the second cone constitutes an even continuation of the thread cut in the first cone, and the result is an absolutely exact alignment of the central lines of the two portions of the thread and a maximum accuracy in the work produced. If the work is a bushing such as represented for instance, this method of working insures the greatest accuracy in the alignment of two pipes or rods screwed to and connected by said bushing.

At the same time it will also be observed that the automatic turning of the work about point d is rendered possible by the same feature, due to the fact that the tool remains in contact with the work at the time of turning there being no displacement of said point of contact of the work with the tool relative to the tool at said time.

While this method of production is especially useful in connection with threaded double-conical pieces it will be understood that the same principle may also be applied in connection with ordinary turning and grinding operations, since the movements of the work in relation to the cutting or grinding tool remain absolutely the same.

It will also be observed that it is not necessary for the two cones to be the exact counter-part of one another; on the contrary one cone may have a certain angle and the other one may have a totally different angle, the only condition for the device to be operative being, that the work be adapted to be angularly displaced about an axis coinciding with an extreme end of the diameter of the circumference where the two cones meet, which is transversal to the longitudinal feed of the tool but on the same plane with the line of travel of the working edge of the tool, and that the extreme angular positions of the work about said axis be so arranged that when the work is in one of its extreme positions the generatrix of one of the cones coincides with the line of travel of the working edge of the tool, and when the work is angularly displaced about said axis and the other extreme position is reached, the generatrix of the other cone coincides with the line of travel of the working edge of the tool; so that the total angular displacement of the work is equivalent to one-half the angle of one of the cones plus one-half the angle of the other.

It will be noted that the conditions under which the work is conducted are the result of the positions and movements of the work and the tool in relation to one another, so that it is not quite necessary for the work to remain longitudinally stationary while the tool is caused to move to and from the work, since a reversal of the functions would be equally satisfactory. It may be stated therefore, that where the work is set to be angularly displaceable about an axis coinciding with the circumference of the meeting line of the two cones in the manner stated, it is immaterial whether the tool is made to move towards the work or whether the tool is maintained stationary and the work is moved longitudinally towards the tool. It will also be understood that while the operation is illustrated in connection with a lathe, parallel conditions may be obtained entering into the scope of my claims with a machine where the work or the tool is caused to rotate about a vertical or inclined axis.

It is obvious that the angular displacement of plate e and of the work carried thereby may be caused by hand if desired, but production will, of course, be speeded up if a suitable automatic control is adopted.

The drawing is intended for illustrative purposes only and not in a limiting sense, since the inventive idea can be applied in a number of ways different from that shown without departing from the scope of my invention; therefore, I reserve myself the right to carry my invention into practice in any way or manner which may enter fairly into the scope of the appended claims.

I claim:

1. The method of machining a double-conical work piece by means of a suitable tool, one of the said two elements being movable towards the other, which consists in setting the work-piece so that the point of the circumference where the two conical surfaces meet located at one end of a diameter transversal to the line of travel of the movable element on the same plane with the working edge of said tool, is in direct alignment with the line of travel of the point where said working edge is applied, angularly setting said work-piece about an axis passing through said point at right angle to a plane passing through said diameter and said line of travel, so that the generatrix of one of the conical surfaces originating at said point is in direct alignment with the line of travel of said working edge, revolving said work-piece about its own axis while said conical surface is machined, angularly displacing said work-piece about said first mentioned axis, upon completion of the machining of said surface, bringing the generatrix of the other conical surface originating at the same point into direct alignment with the line of travel of said working edge, and in machining said other conical surface.

2. In a device of the class described, the combination with a tool and a revoluble work holder, one of said elements being adapted to be moved towards the other, of means for adjusting said work holder transversely of the line of travel of the movable element, and means for angularly displacing said work holder about an axis at right angle to the said line of travel.

3. In a device of the class described, the combination with a tool and a revoluble work holder, one of said elements being adapted to be moved towards the other, of means for adjusting said work holder transversely of the line of travel of the movable element, means for angularly displacing said work holder about an axis at right angle to the said line of travel, and means for limiting the angular displacement of said work holder from one extreme position to another.

4. In a device of the class described, the combination with a tool and a revoluble work holder, one of said elements being adapted to be moved towards the other, of means for adjusting said work holder transversely of the line of travel of the movable element, means for angularly displacing said work holder about an axis at right angle to the said line of travel, and adjustable means for limiting the angular displacement of said work holder from one extreme position to another.

5. In a device of the class described, the combination with a tool and a revoluble work holder, one of said elements being adapted to be moved towards the other, means for adjusting said work holder transversely of the line of travel of the movable element, means for angularly displacing said work holder about an axis at right angle to the said line of travel, and adjustable means for limiting the angular displacement of said work holder from one extreme position to another, of means adapted to be associated with said movable element for releasing the limiting means at one of said extreme angular positions when the said movable element has reached a predetermined point, and means adapted for automatic control effecting angular displacement of said work holder to its other extreme position when said release takes place.

6. In a device of the class described, the combination with a lathe bed and a tool carrier associated therewith, adapted to be moved longitudinally in a horizontal direction, of a plate capable of angular displacements about a vertical axis mounted on said bed, a work holder adapted to continuously rotate about a horizontal axis, and a carrier therefor mounted on and adjustable transversely of said plate.

7. In a device of the class described, the combination with a lathe bed and a tool carrier associated therewith, longitudinally adapted to be moved in a horizontal direction, of a plate capable of angular displacements about a vertical axis, mounted on said bed, a work holder adapted to continuously rotate about a horizontal axis, a carrier therefor mounted on and adjustable transversely of said plate, and means for limiting the angular displacement of said plate from one extreme position to another.

8. In a device of the class described, the combination with a lathe bed and a tool carrier associated therewith, longitudinally adapted to be moved in a horizontal direction, of a plate capable of angular displacements about a vertical axis mounted on said bed, a work holder adapted to continuously rotate about a horizontal axis, a carrier therefor mounted on and adjustable transversely of said plate, and adjustable means for limiting the angular displacement of said plate from one extreme position to another.

9. In a device of the class described, the combination with a lathe bed and a tool carrier associated therewith, longitudinally adapted to be moved in a horizontal direction, of a plate capable of angular displacements about a vertical axis mounted on said bed, a work holder adapted to continuously rotate about a horizontal axis, a carrier therefor mounted on and adjustable transversely of said plate, adjustable means for limiting the angular displacement of said plate from one extreme position to another, means for retaining said plate at one of its extreme positions, means adapted to be operatively associated with said tool carrier adapted to release said retaining means when said tool carrier has reached a predetermined position, and means adapted for automatic control moving said plate to its other extreme angular position upon the release of said retaining means.

10. In a device of the class described, the combination with a tool and a revoluble work holder, one of said elements being adapted to be moved towards the other, of means for adjusting said work holder transversely of the line of travel of the movable element, means for angularly displacing said work holder about an axis at right angle to the said line of travel, and means controlling the angular displacements of said work holder.

11. The method of machining a double-conical work piece by means of a suitable tool, one of the said two elements being movable towards the other, which consists in setting the work-piece so that the point of the circumference where the two conical surfaces meet located at one end of a diameter transversal to the line of travel of the movable element on the same plane with the working edge of said tool, is in direct alignment with the line of travel of the point where said working edge is applied, setting said work piece about an axis passing through said point at right angle to a plane passing through said diameter and the said line of travel, so that said work piece may be angularly displaced about said axis between two extreme positions, in which the generatrices of the conical surfaces originating at said point will be in direct alignment respectively with the said line of travel, machining one of said conical surfaces while said work piece is set at one of its extreme positions, and in angularly displacing said work piece to its other extreme position in order to machine the other conical surface thereof, while the working edge of the tool registers with the aforementioned point of the circumference where the two conical surfaces meet.

In testimony whereof, I have signed my name to this specification.

KARL GOTTMANNS.